United States Patent [19]

Nicolozakes et al.

[11] Patent Number: 4,465,224

[45] Date of Patent: Aug. 14, 1984

[54] METHOD OF REDUCING MICROFISSURING IN WELDS HAVING AN AUSTENITIC STAINLESS STEEL ALLOY BASE METAL

[75] Inventors: Basil J. Nicolozakes, Addison, Ill.; John M. Sanders, Waterford, Conn.; Daniel P. Chiangi; Chris M. Pacula, both of Norwich, Conn.

[73] Assignee: UNC Navel Products, Naval Products Div., Uncasville, Conn.

[21] Appl. No.: 371,603

[22] Filed: Apr. 26, 1982

[51] Int. Cl.³ ............................................. B23K 35/38
[52] U.S. Cl. .................................................... 228/222
[58] Field of Search ........................... 228/222, 263.15; 219/61.7

[56] References Cited

U.S. PATENT DOCUMENTS

| | | | |
|---|---|---|---|
| 2,288,068 | 6/1942 | Brebeck | 29/6 |
| 3,597,833 | 8/1971 | Frederick et al. | 29/479 |
| 4,101,067 | 7/1978 | Sloan et al. | 228/222 |
| 4,152,568 | 5/1979 | Yamaguchi | 219/61.7 |
| 4,209,123 | 6/1980 | Jay | 228/222 |
| 4,218,604 | 8/1980 | Masaoka | 228/222 |
| 4,296,300 | 10/1981 | Bottiglia | 228/222 |

FOREIGN PATENT DOCUMENTS 54-153744  12/1979  Japan ................................. 228/222

Primary Examiner—Nicholas P. Godici
Assistant Examiner—Marc Hodak
Attorney, Agent, or Firm—Pennie & Edmonds

[57] ABSTRACT

Prior to welding, a base metal of an austenitic stainless steel alloy is cooled to approximately −78° C. This process, using a conventional filler metal, reduces microfissuring in welds.

8 Claims, No Drawings

METHOD OF REDUCING MICROFISSURING IN WELDS HAVING AN AUSTENITIC STAINLESS STEEL ALLOY BASE METAL

TECHNICAL FIELD

The invention relates to a method of reducing microfissuring in welds where the base metal comprises a fully austenitic stainless steel alloy.

BACKGROUND OF THE INVENTION

A problem associated with welding materials comprising austenitic stainless steel alloy base metals is that severe microfissuring or hot cracking may occur in the weld fusion zone, heat affected zone and in the base metal itself. This is particularly true where the article to be welded comprises a casting as distinguished from a wrought structure which has different grain morphology and chemical inhomogeneity.

It is believed that the microfissuring of such welds results from microsegregation when certain alloy elements, usually trace impurities, segregate along grain boundaries of either the base metal or weld material during the solidification phase of the welding process. These trace elements and segregated alloy elements in turn lower the melting temperature and therefore create a weaker film at the grain boundaries. At the same time shrinkage stresses build up and may exceed the rupture strength in the boundary film causing microfissuring.

The formation of grain boundaries and subsequent weaker boundary films is aggravated where the base metal comprises a casting. This is because certain alloy ingredients, for example silicon, are usually added to the casting alloy to lower surface tension of the molten alloy to improve its flow characteristics and therefore its castability. These ingredients also tend to lower the melting temperature along the film at grain boundaries thus adding to the microfissuring problem.

Attempts have been made in the past to control microfissuring of austenitic stainless steel welds by control of the chemistry of the filler or of the base metal. For example a filler metal that results in the formation and retention of ferrite in the austenitic weld may be used, or a delta ferrite may be added to the base metal where the ferrite acts as a crack stopper. Use of such filler metals or changes of chemistry in the base metals has not however reduced microfissuring in austenitic stainless steel alloy welds to an acceptable degree even when the weld has been carefully protected during the welding process by a shielding gas such as helium or argon or a mixture thereof.

It is therefore an object of our invention to provide for a process for substantially reducing microfissuring in welds involving fully austenitic stainless steel alloys using conventional filler metal compositions.

DESCRIPTION OF THE INVENTION

Broadly our invention comprises precooling a base metal of an austenitic stainless steel alloy prior to welding to a temperature substantially below $-12°$ C. and preferably approaching $-78°$ C. in order to reduce microsegregation of alloy elements. This may be accomplished by applying dry ice to the base metal prior to, and in some instances, during the welding process. This minimizes trace element segregation and also minimizes the time that any portion of the alloy that may be subject to trace element segregation, and as such having a lower melting temperature, will be subject to a relatively higher temperature where any resulting boundary film would be weakened.

It has been proposed to cool wrought stainless steel structures during and after a welding process in order to reduce chromium carbide precipitation where such precipitation would result in a reduced corrosion resistant property of the structure. Thus in U.S. Pat. No. 4,101,067 there is disclosed an apparatus for cooling stainless steel pipe utilizing a cooling liquid or gas circulating through the pipe in order that a weld may be held below a temperature at which carbide precipitation occurs. However since pipe involves a wrought structure where an initial casting is subsequently worked upon by either forging, rolling, pressing, drawing or extruding, any large columnar grains and associate heterogeneous microstructure of the material comprising the pipe is broken up such that the material has uniform mechanical and physical properties with the result that the material is generally more weldable and not subjected to microfissuring problems. If such structure is further annealed after working, recrystallization would occur resulting in even further uniformity of mechanical and physical properties and even further weldability. The alloys of wrought structures do not generally contain ingredients to improve flow characteristics of the alloys and thus their castability, as are included in alloys intended for use in cast articles which are not to be worked. Thus stainless steel alloys used in wrought structures, as in the aforementioned patent, are not faced with the problems of microfissuring to the extent austenitic stainless steel alloys intended for use in cast articles are.

We have found that the process following our invention as broadly described above has worked particularly well for a fully austenitic stainless steel alloy identified by ASTM (American Society for Testing Materials) in standard specification A744 "Corrosion-Resistant Iron-Chromium-Nickel and Nickel-Base Alloy Castings for Severe Service" as grade No. CN-7M. This particular grade has the following chemical requirements:

| Type | COMPOSITION % | | | | | | | | | |
|---|---|---|---|---|---|---|---|---|---|---|
| | C Max | Mn Max | Si Max | P Max | S Max | Cr | Ni | Mo | Cu | Fe |
| 20 Chromium 29 Nickel, with Copper and Molybdenum | 0.07 | 1.50 | 1.50 | 0.04 | 0.04 | 19.0–22.0 | 27.5–30.5 | 2.0–3.0 | 3.0–4.0 | Rem |

Test welds were conducted on pull bars made of a grade CN-7M alloy and which had the following specific material composition:

| C | Mn | Si | P | S | Cr | Ni | Mo | Cu | Fe |
|---|---|---|---|---|---|---|---|---|---|
| 50.045 | 1.14 | 1.48 | 0.023 | 0.021 | 19.9 | 28.30 | 2.7 | 3.6 | Rem |

A pull bar which had dimensions of 0.35"×2"×8" was laid on a block of dry ice having a dimension of approximately 3"×6"×10" until after a period of approximately thirty minutes the temperature between the bar and block was equalized at approximately −78° C. The bar was then removed from the block and placed on a steel plate to hold the bar in position and to provide an electrical ground contact. A manual TIG weld pass was then made along the length of the bar using an Inconel ® EN-82 filler wire of 0.062" diameter and the material composition of which is:

| C | Cr | Co | Cb | Cu | Fe | Mn | Ni | P | Si | S |
|---|---|---|---|---|---|---|---|---|---|---|
| 0.02 | 20.17 | 0.02 | 2.44 | 0.05 | 0.16 | 2.87 | 73.69 | 0.005 | 0.17 | 0.007 |

After completion of one weld pass, the pull bar was returned to the dry ice block and held until it again reached thermal equilibrium with the block after which a second welding pass similar to the first pass was made on the pull bar.

The welding current during both passes was 80 amps with the voltage being manually held in the range of 12.5–14.0 volts using straight polarity with the electrode being negative.

Dye penetrant and metallographic examination of the weldment disclosed no cracks.

Tests were also conducted in which a pull bar of the same chemical composition was precooled by immersing in a brine solution to a temperature of approximately −12.2° C. after which a test weld was made as described above. Subsequent examination disclosed substantial microfissuring of the weldment.

While the test of the invention involved a specific grade of a fully austenitic stainless steel base metal alloy precooled by dry ice and utilizing a specific filler metal, the invention contemplates welding of other grades of fully austenitic stainless steel alloys both cast and wrought using other precooling means, as for example liquid nitrogen, and other filler wires having different metal chemistry where the precooling of the base metal serves to reduce microsegregation of alloy elements along grain boundaries and subsequent microfissuring.

We claim:

1. A method of reducing microfissuring in welds utilizing a base metal consisting essentially of an austenitic stainless steel alloy and a filler metal comprising the steps of precooling the base metal to substantially −78° C. immediately prior to welding.

2. A method of reducing microfissuring according to claim 1 wherein the base metal is precooled by the application of dry ice.

3. A method of reducing microfissuring according to claim 2 including the additional step of applying dry ice to the base metal during welding.

4. A method of reducing microfissuring according to claim 1 wherein said alloy comprises an ASTM A744-CN-7M alloy.

5. A method of reducing microfissuring according to claim 1 wherein said alloy has less than 4% delta ferrite.

6. A method of reducing microsegregation of alloy elements and resultant microfissuring in welds of base metals consisting essentially of a fully austenitic stainless steel alloy including the steps of precooling the base metal to a temperature of approximately −78° C. immediately prior to welding.

7. A method of reducing microsegregation according to claim 6 wherein said base metal comprises a casting.

8. A method of reducing microfissuring in welds utilizing a base metal consisting essentially of an austenitic stainless steel alloy and a filler metal comprising the step of precooling the base metal to a temperature in the range of −78° to −210° C. immediately prior to welding.

* * * * *

UNITED STATES PATENT AND TRADEMARK OFFICE
CERTIFICATE OF CORRECTION

PATENT NO. : 4,465,224

DATED : August 14, 1984

INVENTOR(S) : Nicolozakes et al.

It is certified that error appears in the above-identified patent and that said Letters Patent is hereby corrected as shown below:

Title page, Item 73, under Assignee, change "UNC Navel Products, Naval Products Div." to --UNC Resources Falls Church, Va.--

Signed and Sealed this

Fifth Day of March 1985

[SEAL]

Attest:

DONALD J. QUIGG

Attesting Officer

Acting Commissioner of Patents and Trademarks